United States Patent
Choi et al.

(10) Patent No.: US 12,456,524 B2
(45) Date of Patent: Oct. 28, 2025

(54) MEMORY DEVICE, OPERATING METHOD THEREOF, AND VERIFICATION RESULT GENERATOR

(71) Applicant: SK hynix Inc., Icheon-si (KR)

(72) Inventors: Hyung Jin Choi, Icheon-si (KR); Chan Sik Park, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 236 days.

(21) Appl. No.: 18/319,292

(22) Filed: May 17, 2023

(65) Prior Publication Data

US 2024/0177779 A1 May 30, 2024

(30) Foreign Application Priority Data

Nov. 29, 2022 (KR) .................. 10-2022-0163010

(51) Int. Cl.
*G11C 7/00* (2006.01)
*G11C 16/24* (2006.01)
*G11C 16/26* (2006.01)

(52) U.S. Cl.
CPC .............. *G11C 16/26* (2013.01); *G11C 16/24* (2013.01)

(58) Field of Classification Search
CPC ....... G11C 7/1051; G11C 7/1078; G11C 7/22; G11C 7/106; G11C 7/1057
USPC ........................................ 365/189.05, 189.15
See application file for complete search history.

(56) References Cited

U.S. PATENT DOCUMENTS

2013/0286746 A1* 10/2013 Choi .................. G11C 16/3454
365/185.22

FOREIGN PATENT DOCUMENTS

KR 1020130121434 A 11/2013
KR 1020200139040 A 12/2020

* cited by examiner

*Primary Examiner* — Son T Dinh
(74) *Attorney, Agent, or Firm* — WILLIAM PARK AND ASSOCIATES LTD.

(57) ABSTRACT

A memory device includes: a memory cell array including a plurality of memory cells; a peripheral circuit including a plurality of page buffers respectively connected to the plurality of memory cells; a sensing circuit connected to the plurality of page buffers respectively, the sensing circuit: performing a sensing operation on the page buffers in units of a plurality of chunks, each chunk including two or more page buffers, among the plurality of page buffers, and outputting a sensing result of each of the plurality of chunks; a verification result output circuit for outputting a final verification result of a target program state, among a plurality of program states to which the memory cells are to be programmed, based on the sensing results of the plurality of chunks; and a control logic for controlling the sensing circuit and the peripheral circuit, based on the final verification result.

19 Claims, 16 Drawing Sheets

MEMORY DEVICE, OPERATING METHOD THEREOF, AND VERIFICATION RESULT GENERATOR

CROSS-REFERENCE TO RELATED APPLICATION

The present application claims priority under 35 U.S.C. § 119(a) to Korean patent application number 10-2022-0163010 filed on Nov. 29, 2022, in the Korean Intellectual Property Office, the entire disclosure of which is incorporated by reference herein.

BACKGROUND

1. Technical Field

The present disclosure generally relates to a memory device, an operating method thereof, and a verification result generator.

2. Related Art

A semiconductor memory device performs program verification for checking whether a program has been normally performed. In the past, a program verification could only check whether all memory cells connected to a selected page had been completely programmed through program verification. However, different verification techniques capable of counting a number of memory cells that are not completely programmed, among all the memory cells connected to the selected page, have been sought after.

SUMMARY

In accordance with an aspect of the present disclosure, there is provided a memory device including: a memory cell array including a plurality of memory cells; a peripheral circuit including a plurality of page buffers respectively connected to the plurality of memory cells through a plurality of bit lines; a sensing circuit connected to the plurality of page buffers respectively through a plurality of sensing lines, the sensing circuit: performing a sensing operation on the page buffers in units of a plurality of chunks, each chunk including two or more page buffers, among the plurality of page buffers, and outputting a sensing result of each of the plurality of chunks; a verification result output circuit configured to output a final verification result of a target program state, among a plurality of program states to which the memory cells are to be programmed, based on the sensing results of the plurality of chunks; and a control logic configured to control the sensing circuit and the peripheral circuit, based on the final verification result, wherein the verification result output circuit is configured to output circuit outputs a final verification result representing that a verification on the target program state has passed when a sensing result of at least one chunk group, among a plurality of chunk groups, each including one or more of the plurality of chunks, represents pass.

In accordance with another aspect of the present disclosure, there is provided a method of operating a memory device, the method including: performing a verification on a target program state, among a plurality of program states to which a plurality of memory cells are to be programmed; performing a sensing operation on a plurality of page buffers respectively connected to the memory cells through bit lines in units of a plurality of chunks, each chunk including two or more page buffers, among the plurality of page buffers, to acquire a verification result of the target program state; outputting a sensing result of each of the plurality of chunks; outputting chunk group verification signals representing whether a verify operation on a plurality of chunk groups, each chunk group including one or more of the plurality of chunks, has passed; and outputting a final verification result, representing a verification result of the target program state, based on the chunk group verification signals.

In accordance with still another aspect of the present disclosure, there is provided a verification result generator including: a sensing circuit configured to perform a sensing operation on a plurality of page buffers respectively connected to a plurality of memory cells in units of a plurality of chunks, each chunk including two or more page buffers, among the plurality of page buffers, and configured to output a sensing result of each of the plurality of chunks; a plurality of first logic gates configured to output chunk group verification signals of respective chunk groups, each chunk group including one or more chunks, by combining the sensing results of the chunks for each of the chunk groups; and a second logic gate configured to, when at least one chunk group verification signal among the chunk group verification signals represents pass, output a final verification result representing pass by combining the chunk group verification signals.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Embodiments provide a memory device having an improved operation speed, an operating method thereof, and a verification result generator.

Figure 1:
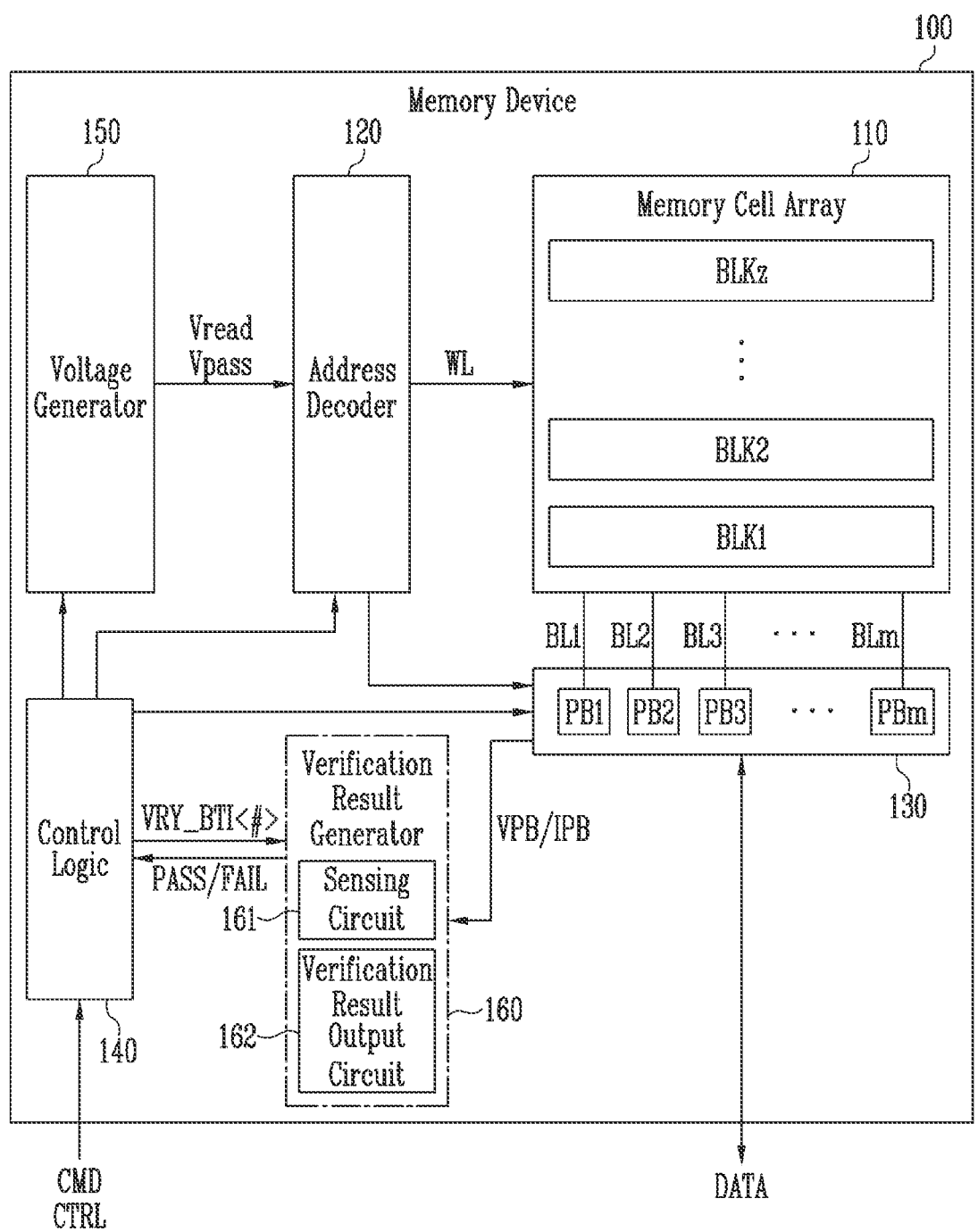
FIG. 1 is a diagram illustrating a memory device in accordance with an embodiment of the present disclosure.

FIG. 1 is a diagram illustrating a memory device in accordance with an embodiment of the present disclosure.

Referring to FIG. 1, the memory device 100 may include a memory cell array 110, an address decoder 120, a read/write circuit 130, a control logic 140, a voltage generator 150, and a verification result generator 160.

The memory cell array 110 may include a plurality of memory blocks BLK1 to BLKz. The plurality of memory blocks BLK1 to BLKz may be connected to the address decoder 120 through word lines WL. The plurality of memory blocks BLK1 to BLKz may be connected to the read/write circuit 130 through bit lines BL1 to BLm. Each of the plurality of memory blocks BLK1 to BLKz may include a plurality of memory cells. In an embodiment, the plurality of memory cells may be nonvolatile memory cells and may be configured as nonvolatile memory cells having a vertical channel structure. The memory cell array 110 may be configured as a memory cell array having a two-dimensional structure. In some embodiments, the memory cell array 110 may be configured as a memory cell array having a three-dimensional structure. Meanwhile, each of the plurality of memory cells included in the memory cell array 110 may store at least one-bit data. In an embodiment, each of plurality of the memory cells included in the memory cell array 110 may be a single-level cell (SLC) storing one-bit data. In another embodiment, each of the plurality of memory cells included in the memory cell array 110 may be a multi-level cell (MLC) storing two-bit data. In still another embodiment, each of the plurality of memory cells included in the memory cell array 110 may be a triple-level cell (TLC) storing three-bit data. In still another embodiment, each of the plurality of memory cells included in the memory cell array 110 may be a quadruple-level cell (QLC) storing four-bit data. In some embodiments, the memory cell array 110 may include a plurality of memory cells each storing five-or-more bit data.

In an embodiment, the memory cell array may be connected to the address decoder 120, the read/write circuit 130, the control logic 140, the voltage generator 150, and the verification result generator 160 in a peri-under-cell (PUC) structure. The PUC structure may mean a structure in which such a peripheral circuit is formed in a region under the memory cell array 110.

The address decoder 120 may be connected to the memory cell array 110 through the word lines WL. The address decoder 120 may be operated under the control of the control logic 140. The address decoder 120 may receive an address through an input/output buffer (not shown) in the memory device 100.

The address decoder 120 may decode a block address in the received address. The address decoder 120 may select at least one memory block according to the decoded block address. Also, in a read voltage application operation during a read operation, the address decoder 120 may apply a read voltage Vread generated by the voltage generator 150 to a selected word line of the selected memory block and may apply a pass voltage Vpass generated by the voltage generator 150 to the other unselected word lines. Also, in a program verify operation, the address decoder 120 may apply a verify voltage generated by the voltage generator 150 to the selected word line of the selected memory block and may apply the pass voltage Vpass to the other unselected word lines.

The address decoder 120 may decode a column address in the received addresses. The address decoder 120 may transmit the decoded column address to the read/write circuit 130.

Read and program operations of the memory device 100 may be performed in units of pages. An address received in response to a request for the read and program operations may include a block address, a row address, and a column address. The address decoder 120 may select one memory block and one word line according to the block address and the row address. The column address may be decoded by the address decoder 120 to be provided to the read/write circuit 130. In this specification, memory cells connected to one word line may be designated as one "physical page."

The read/write circuit 130 may include a plurality of page buffers PB1 to PBm. The plurality of page buffers PB1 to PBm may be referred to as a page buffer group. The read/write circuit 130 may be operated as a "read circuit" in a read operation of the memory cell array 110 and may be operated as a "write circuit" in a write operation of the memory cell array 110. The plurality of page buffers PB1 to PBm may be connected to the memory cell array 110 through the bit lines BL1 to BLm. The plurality of page buffers PB1 to PBm may sense a threshold voltage of memory cells in a read operation and a program verify operation. In an embodiment, in order to sense the threshold voltage of the memory cells, the plurality of page buffers PB1 to PBm may sense a change in an amount of current flowing according to a program state of a corresponding memory cell while continuously supplying a sensing current to bit lines connected to the memory cells. The change in the amount of current may be sensed through a sensing node and may be latched as sensing data. The read/write circuit 130 may be operated in response to page buffer control signals output from the control logic 140.

The read/write circuit 130 may temporarily store read data by sensing data of a memory cell in a read operation and then may output data DATA to the input/output buffer (not shown) of the memory device 100. In an exemplary embodiment, the read/write circuit 130 may include a column select circuit and the like, in addition to the page buffers (or page registers).

The control logic 140 may be connected to the address decoder 120, the read/write circuit 130, the voltage generator 150, and the verification result generator 160. The control logic 140 may receive a command CMD and a control signal CTRL though the input/output buffer (not shown) of the memory device 100. The control logic 140 may control a general operation of the memory device 100 in response to the control signal CTRL. Also, the control logic 140 may output a control signal for adjusting a sensing node precharge potential level of the plurality of page buffers PB1 to PBm. The control logic 140 may control the read/write circuit 130 to perform a program operation of the memory cell array 110. The control logic 140 may control the read/write circuit 130 to perform a read operation of the memory cell array 110. The control logic 140 may receive a final verification result from the verification result generator 160. The control logic 140 may control the read/write circuit 130 to perform the program operation of the memory cell array 110 based on the received final verification result.

The voltage generator 150 may generate the read voltage Vread and the pass voltage Vpass in a read operation in response to a control signal output from the control logic 140. In order to generate a plurality of voltages having various voltage levels, the voltage generator 150 may include a plurality of pumping capacitors for receiving an internal power voltage and may generate the plurality of voltages by selectively activating the plurality of pumping capacitors under the control of the control logic 140.

The verification result generator 160 may perform a sensing operation on a verification value stored in the page buffers PB1 to PBm within the read/write circuit 130 under the control of the control logic 140. The verification value stored in the page buffers PB1 to PBm may be a value representing a result obtained by applying a verify voltage to the memory cells included in the memory cell array 110, and accordingly, comparing the verify voltage with a threshold voltage of a target program state among a plurality of program states. In this specification, the sensing operation may mean a process of checking whether verification according to a specific program state has passed as the verify voltage is applied. The verification result generator 160 may be connected to the read/write circuit 130 through a plurality of sensing lines. In an embodiment, the verification result generator 160 may select a chunk on which verification is to be performed, based on a chunk select signal received from the control logic 140 in the sensing operation. In an embodiment, in the sensing operation, the verification result generator 160 may generate a reference current in response to an allow bit VRY_BIT<#> received from the control logic 140 and may output a pass signal PASS or a fail signal FAIL by comparing a sensing voltage VPB received from the page buffers PB1 to PBm included in the read/write circuit 130 with a reference voltage generated by the reference current. Alternatively, in the sensing operation, the verification result generator 160 may generate a reference voltage in response to an allow bit VRY_BIT<#> received from the control logic 140 and may output a pass signal PASS or a fail signal FAIL by comparing a sensing current IPB received from the page buffers PB1 to PBm included in the read/write circuit 130 with a reference current generated by the reference voltage.

The verification result generator 160 may provide a final verification result to the control logic 140. The verification result generator 160 may include a sensing circuit 161 and a verification result output circuit 162. An embodiment of the verification result generator 160 will be described in more detail with reference to FIGS. 4 to 8.

The address decoder 120, the read/write circuit 130, and the voltage generator 150 may function as a "peripheral circuit." The peripheral circuit may perform a read operation, a write operation, and an erase operation on the memory cell array 110 under the control of the control logic 140.

Figure 2:
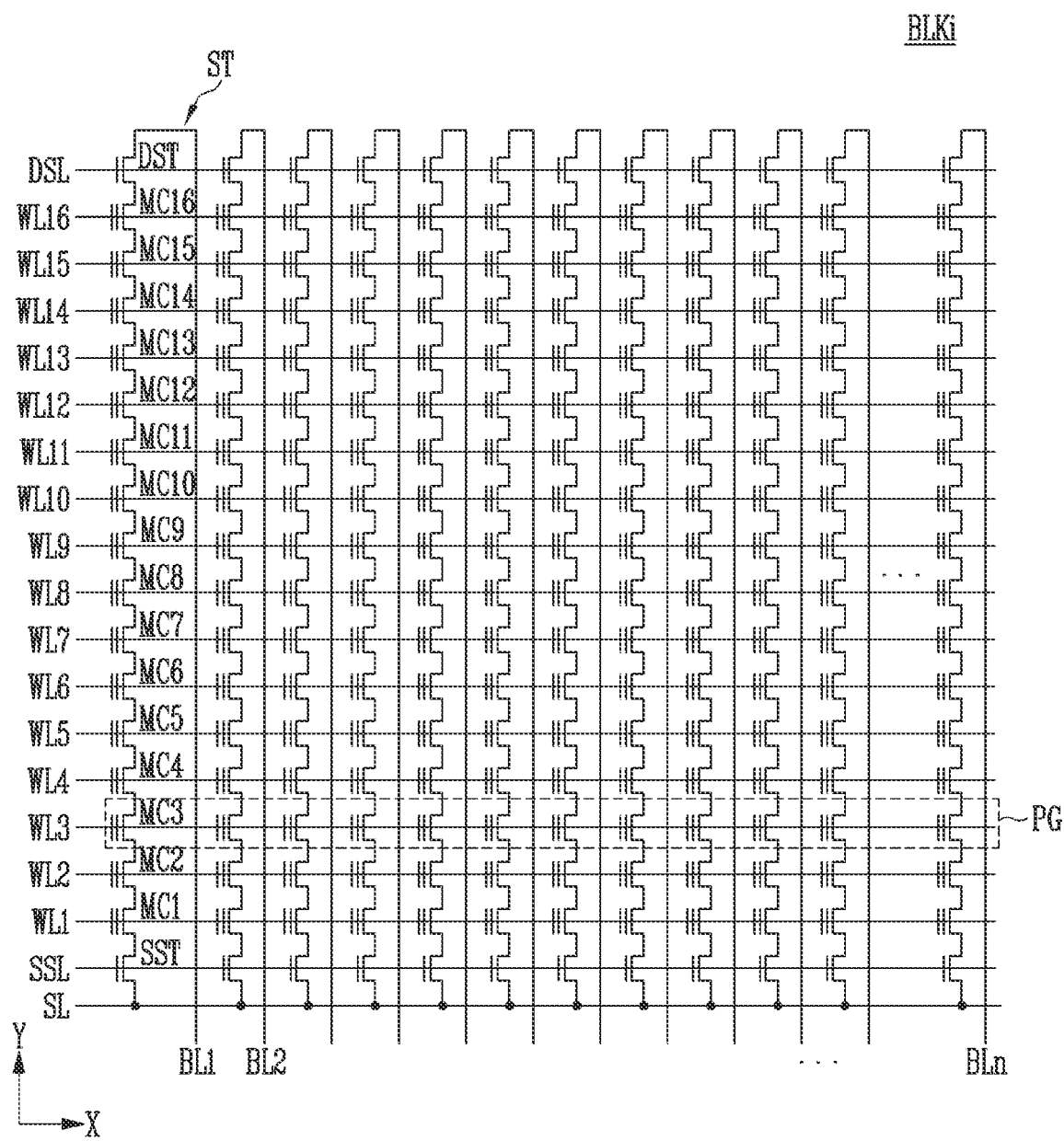
FIG. 2 is a diagram illustrating a structure of any one memory block included in a memory cell array shown in FIG. 1.

FIG. 2 is a diagram illustrating a structure of any one memory block included in the memory cell array shown in FIG. 1.

FIG. 2 is a diagram illustrating any one memory block BLKi, among the plurality of memory blocks included in the memory cell array 110, shown in FIG. 1.

Referring to FIG. 2, a plurality of word lines arranged in parallel to one another may be connected between a first select line and a second select line. The first select line may be a source select line SSL, and the second select line may be a drain select line DSL. More specifically, the memory block BLKi may include a plurality of strings ST connected between bit lines BL1 to BLn and a source line SL. The bit lines BL1 to BLn may be connected to the strings ST, respectively, and the source line SL may be commonly connected to the strings ST. The strings ST may be configured identically to one another, and therefore, a string ST connected to a first bit line BL1 will be described in detail as an example.

The string ST may include a source select transistor SST, a plurality of memory cells MC1 to MC16, and a drain select transistor DST, which are connected in series between the source line SL and the first bit line BL1. At least one source select transistor SST and at least one drain select transistor DST may be included in one string ST, and memory cells of which number is greater than the number of the memory cells MC1 to MC16, shown in the drawing, may be included in the one string ST.

A source of the source select transistor SST may be connected to the source line SL, and a drain of the drain select transistor DST may be connected to the first bit line BL1. The memory cells MC1 to MC16 may be connected in series between the source select transistor SST and the drain select transistor DST. Gates of source select transistors SST included in different strings ST may be connected to the source select line SSL, gates of drain select transistors DST included in different strings ST may be connected to the drain select line DSL, and gates of memory cells MC1 to MC16 included in different strings ST may be connected to a plurality of word lines WL1 to WL16. A group of memory cells connected to the same word line among memory cells included in different strings ST may be referred to as a physical page PG. Therefore, pages PG of which number corresponds to the number of the word lines WL1 to WL16 may be included in the memory block BLKi.

One memory cell may store 1-bit data. This is generally referred to as a single level cell (SLC). One physical page PG may store one logical page data. One logical page data may include bits of data, the number of which corresponds to the number of cells included in one physical page PG.

One memory cell may store two-or-more-bit data. One physical page PG may store two or more logical page data.

Figure 3:
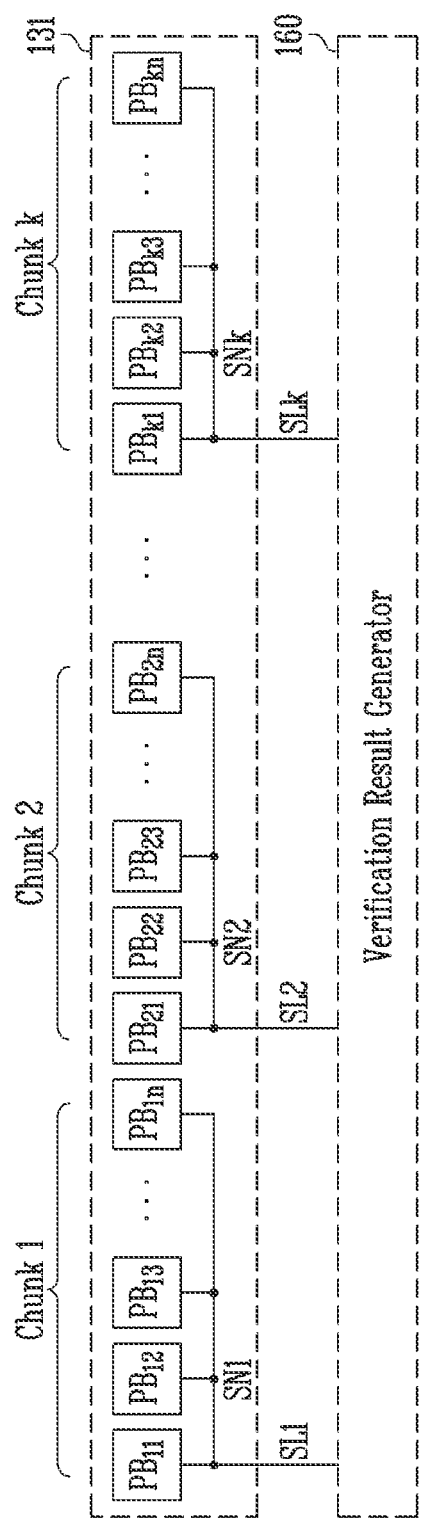
FIG. 3 is a diagram illustrating a page buffer of the memory device in accordance with an embodiment of the present disclosure.

FIG. 3 is a diagram illustrating a page buffer of the memory device in accordance with an embodiment of the present disclosure.

Referring to FIGS. 1 and 3, a page buffer group 13 included in the read/write circuit 130 may include a plurality of page buffers PB11 to PBkn. Although not shown in FIG. 3, the plurality of page buffers PB11 to PBkn may be respectively connected to corresponding bit lines. Referring to FIGS. 1 and 3 together, the page buffers PB1 to PBm, shown in FIG. 1, may respectively correspond to the page buffers PB11 to PBkn, shown in FIG. 3. Therefore, the page buffers PB11 to PBkn, shown in FIG. 3, may be respectively connected to the bit lines BL1 to BLm. The number of the page buffers PB11 to PBkn, shown in FIG. 3, may be a total of n*k. That is, in the relationship of FIG. 3 with FIG. 1, a relation of m=nk may be established.

According to the memory device in accordance with the present disclosure, at least two page buffers may be connected to one sharing node. In the embodiment shown in FIG. 3, n page buffers may be connected to one sharing node. That is, the page buffers PB11 to PB1$n$ may be connected to a first sharing node SN1, page buffers PB21 to PB2$n$ may be connected to a second sharing node SN2, and page buffers PBk1 to PBkn may be connected to a kth sharing node SNk.

The page buffer group 131 may be connected to the verification result generator 160 through sensing lines SL1 to SLk. The sensing lines SL1 to SLk may be respectively connected to sharing nodes SN1 to SNk to which the page buffers of the page buffer group 131 are connected.

Therefore, the page buffers PB11 to PB1$n$ may be connected to the verification result generator 160 through a first sensing line SL1, the page buffers PB21 to PB2$n$ may be connected to the verification result generator 160 through a second sensing line SL2, and the page buffers PBk1 to PBkn may be connected to the verification result generator 160 through a kth sensing line SLk.

In the structure shown in FIG. 3, page buffers connected to one sharing node may be defined as one chunk. That is, the page buffers PB11 to PB1$n$ connected to the first sharing node SN1 may be defined as a first chunk Chunk 1, the page buffers PB21 to PB2$n$ connected to the second sharing node SN2 may be defined as a second chunk Chunk 2, and the page buffers PBk1 to PBkn connected to the kth sharing node SNk may be defined as a kth chunk Chunk k. Therefore, the first chunk Chunk 1 may be connected to the verification result generator 160 through the first sensing line SL1, the second chunk Chunk 2 may be connected to the verification result generator 160 through the second sensing line SL2, and the kth chunk Chunk k may be connected to the verification result generator 160 through the kth sensing line SLk. In an embodiment, in response to a signal for selecting any one chunk among first to kth chunks Chunk 1 to Chunk k, the verification result generator 160 may further include a sensing line select circuit (not shown) for selecting any one of first to kth sensing lines SL1 to SLk and connecting the selected sensing line to the verification result generator 160. The sensing line select circuit (not shown) may include k transistors (not shown) located between the respective first to kth sensing lines SL1 to SLk from the first to kth chunks Chunk 1 to Chunk k and the verification result generator 160. Each of the k transistors (not shown) may be turned on or turned off in response to the signal for selecting any one chunk among the first to kth chunks Chunk 1 to Chunk k. Therefore, the verification result generator 160 may perform the sensing operation in units of chunks. When a plurality of chunks exist, the verification result generator 160 may perform the sensing operation sequentially on the plurality of chunks.

Figure 4:
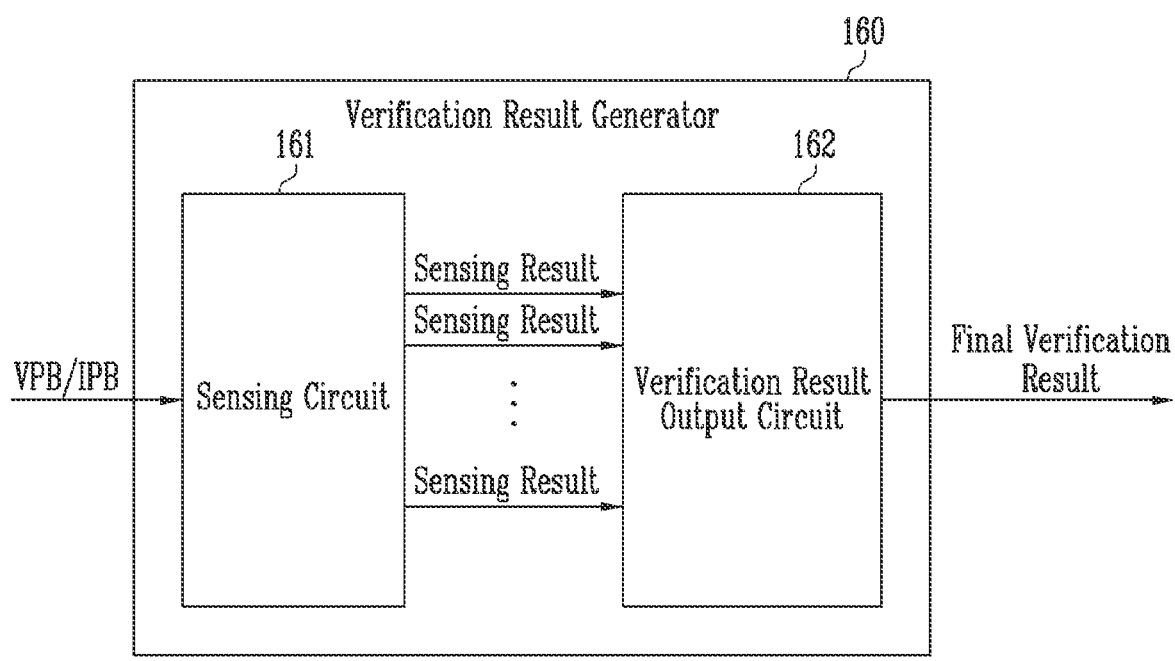
FIG. 4 is a diagram illustrating a verification result generator in accordance with an embodiment of the present disclosure.

FIG. 4 is a diagram illustrating a verification result generator in accordance with an embodiment of the present disclosure.

Referring to FIGS. 3 and 4, the verification result generator 160 may include a sensing circuit 161 and a verification result output circuit 162. The sensing circuit 161 may receive a sensing voltage VPB or a sensing current IPB from the page buffers PB1 to PBm included in the page buffer group 131. The sensing voltage VPB or the sensing current IPB may be received in units of chunks as described in FIG. 3. Based on the received sensing voltage VPB or the received sensing current IPB, the sensing circuit 161 may check whether a program fail has occurred within fail bits of which number is set in each chunk unit. For example, when a chunk in which two or less fail bits occur is determined as program pass, a chunk in which three fail bits occur may be regarded as the program fail. The sensing circuit 161 may provide the verification result output circuit 162 with a plurality of sensing results representing pass or fail for each chunk. An embodiment of the sensing circuit 161 will be described in more detail later with reference to FIG. 5.

The verification result output circuit 162 may output a final verification result by combining a sensing result of the respective plurality of chunks. An embodiment of the verification result output circuit 162 will be described in more detail later with reference to FIGS. 6 to 8.

Figure 5:
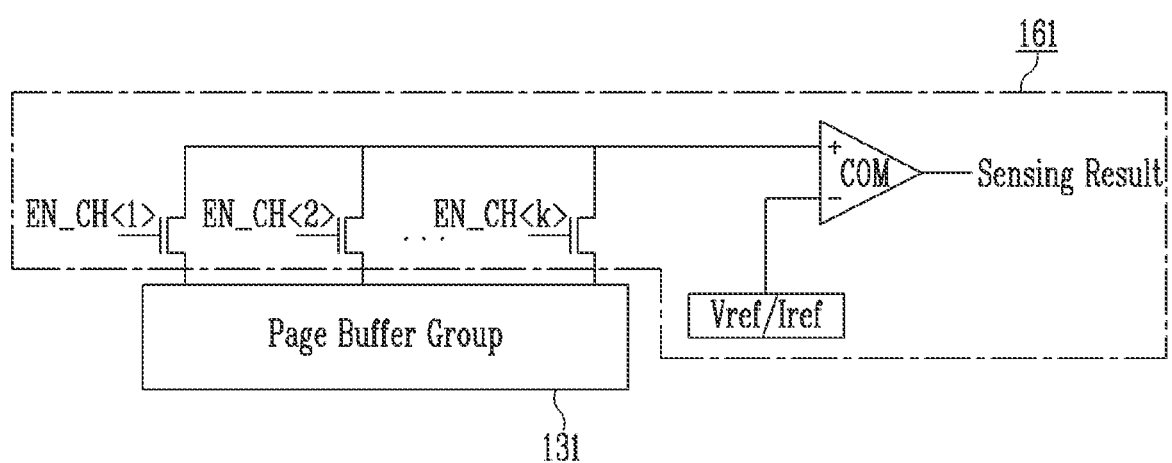
FIG. 5 is a circuit diagram illustrating a sensing circuit included in the verification result generator in accordance with an embodiment of the present disclosure.

FIG. 5 is a circuit diagram illustrating a sensing circuit included in the verification result generator in accordance with an embodiment of the present disclosure.

Referring to FIG. 5, the sensing circuit 161 may receive a sensing voltage or a sensing current from a plurality of chunks, each including page buffers in the page buffer group 131. In an embodiment, a sensing voltage or a sensing current of a chunk, selected by one of the chunk select signals EN_CH<1> to EN_CH<k>, may be provided to the sensing circuit 161. The sensing circuit 161 may include a comparator COM, and a reference voltage Vref or a reference current Iref may be provided to the comparator COM. The reference voltage Vref or the reference current Iref may vary according to the number of fail bits which become a reference which can be recognized as program pass in one chunk. For example, when no fail bit exists in all page buffers of a selected chunk, a current having the same magnitude as a current flowing in a verification line when program pass data is stored in all the page buffers of the selected chunk may be provided as the reference current Iref. In addition, when a case in which one fail bit exists in the selected chunk is to be determined as the program pass, program fail data may be stored in only one page buffer, among page buffers of the selected chunk, and a current having the same magnitude as a current flowing in the verification line, when the program pass data is stored in the other page buffers, may be provided as the reference current Iref.

The comparator COM may compare the sensing voltage or the sensing current, which is received from the page buffer group 131, with the reference voltage Vref or the reference current Iref. The comparator COM may output a pass or fail signal as a sensing result corresponding to the selected chunk according to a comparison result. For example, when a sensing value received from the page buffer group 131 is higher than a reference value, the comparator COM may output a high level signal. When the sensing value received from the page buffer group 131 is lower than the reference value, the comparator COM may output a low level signal.

FIG. 5 is a diagram illustrating the sensing circuit 161 in accordance with the embodiment of the present disclosure, and components unnecessary for description have been omitted. The sensing circuit 161 may further include an additional inverter, an additional transistor, an additional impedance, and the like, in addition to the components shown in FIG. 5.

Figure 6:
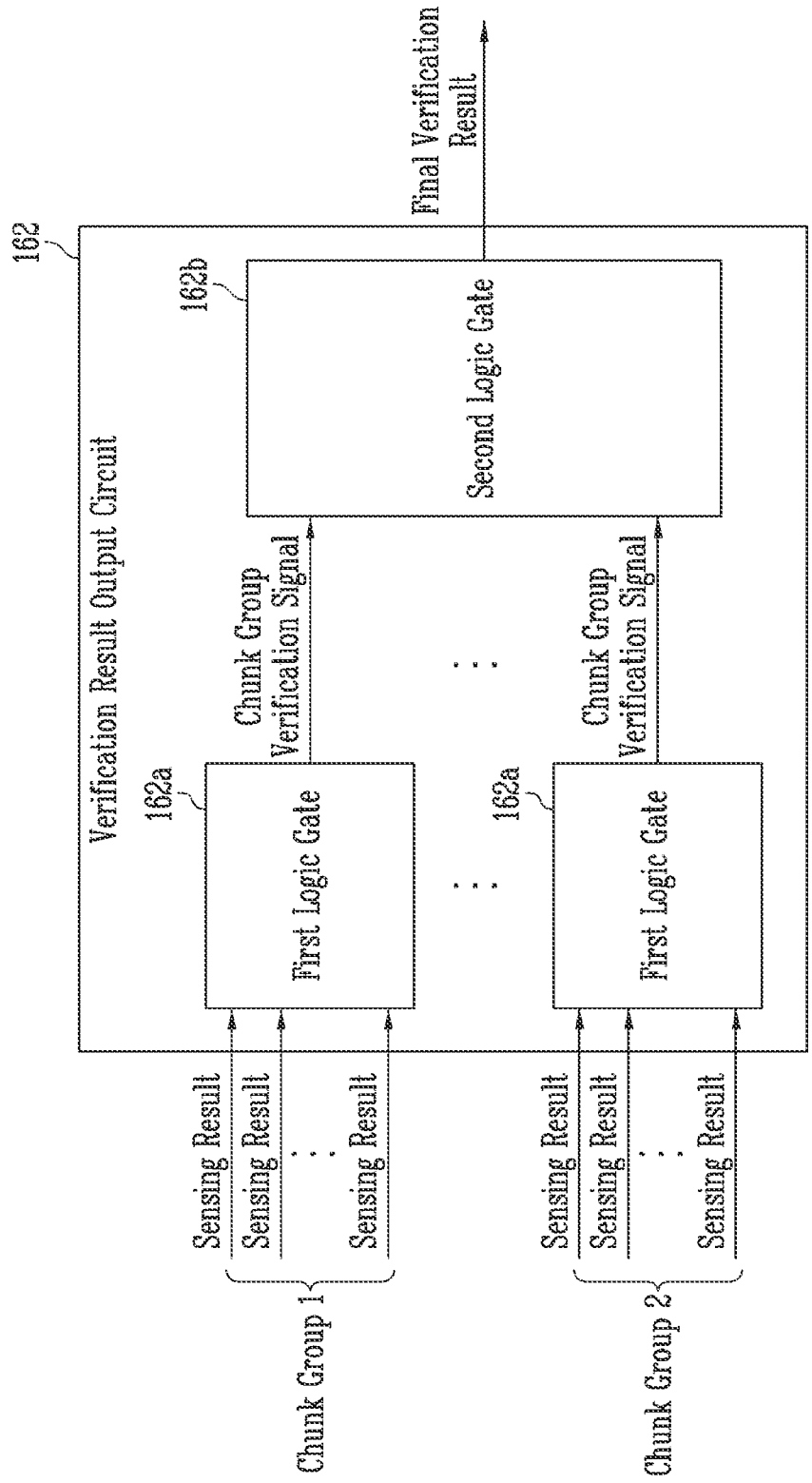
FIG. 6 is a diagram illustrating a verification result output circuit included in the verification result generator in accordance with an embodiment of the present disclosure.

FIG. 6 is a diagram illustrating a verification result output circuit included in the verification result generator in accordance with an embodiment of the present disclosure.

The verification result output circuit 162 may include a first logic gate 162*a* and a second logic gate 162*b*. The verification result output circuit 162 may include a plurality of first logic gates 162*a*. The first logic gate 162*a* may receive sensing results corresponding to a plurality of chunks. Sensing results of chunks sorted into different chunk groups may be provided to different first logic gates 162*a*. For example, sensing results of chunks sorted as a first chunk group Chunk Group 1 and sensing results of chunks sorted as a second chunk group Chunk Group 2 may be provided to different first logic gates. The first logic gate 162*a* may output a chunk group verification signal by combining the received sensing results. The chunk group verification signal may be a signal representing verification pass or verification fail of any one chunk group. The plurality of first logic gates 162*a* may output chunk group verification signals corresponding to different chunk groups, and chunk group verification signals output from the plurality of first logic gates 162*a* may be provided to the second logic gate 162*b*.

The second logic gate 162*b* may output a final verification result by combining the received chunk group verification signals. The final verification result may be a signal representing verification pass or verification fail of all the page buffers.

Figure 7:
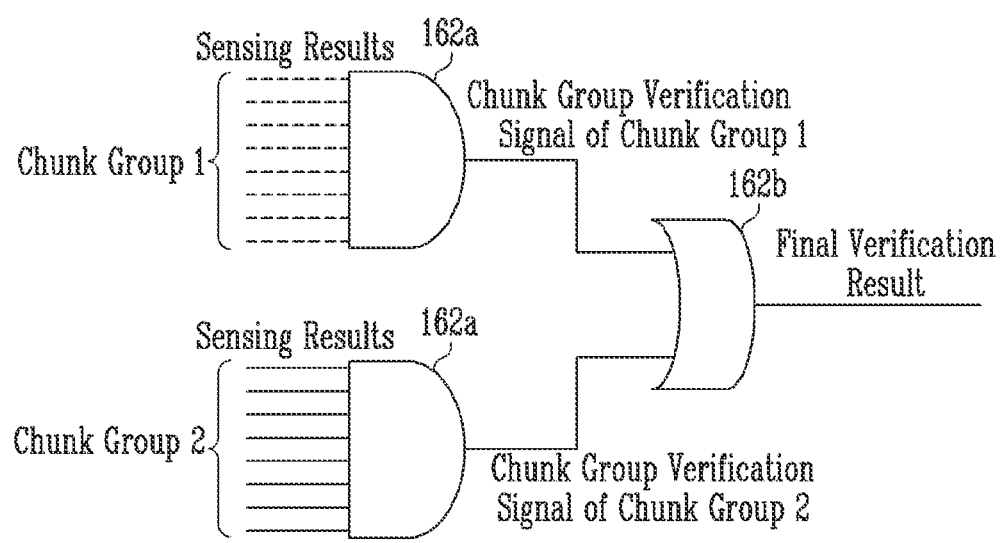
FIG. 7 is a circuit diagram illustrating an example of the verification result output circuit shown in FIG. 6.

FIG. 7 is a circuit diagram illustrating an example of the verification result output circuit shown in FIG. 6.

The verification result output circuit 162 may include two first logic gates 162*a* and one second logic gate 162*b*. The first logic gate 162*a* may be a logic gate for outputting a chunk group verification signal representing a pass when sensing results corresponding to all chunks included in a chunk group represent a pass. For example, the first logic gate 162*a* may be an AND gate. That is, when sensing results input to any one first logic gate 162*a* are all 1, which means a pass, the chunk group verification signal may be output as 1, which means a pass. The two first logic gates 162*a* may respectively output a chunk group verification signal of a first chunk group and a chunk group verification signal of a second chunk group to the second logic gate 162*b*.

The second logic gate 162*b* may be a logic gate for outputting a final verification result representing pass when any one signal, among the chunk group verification signals received from the first logic gates, represents a pass. For example, the second logic gate 162*b* may be an OR gate. That is, when at least one of the chunk group verification signals input to the second logic gate 162*b* is 1, which means a pass, the final verification result may be output as 1, which means a pass. When at least one of the chunk group verification signal corresponding to the first chunk group and the chunk group verification signal corresponding to the second chunk group represents a pass, the second logic gate 162*b* may output the final verification result representing a pass. When both the chunk group verification signal corresponding to the first chunk group and the chunk group verification signal corresponding to the second chunk group represents a fail, the second logic gate 162*b* may output the final verification result representing a fail.

Figure 8:
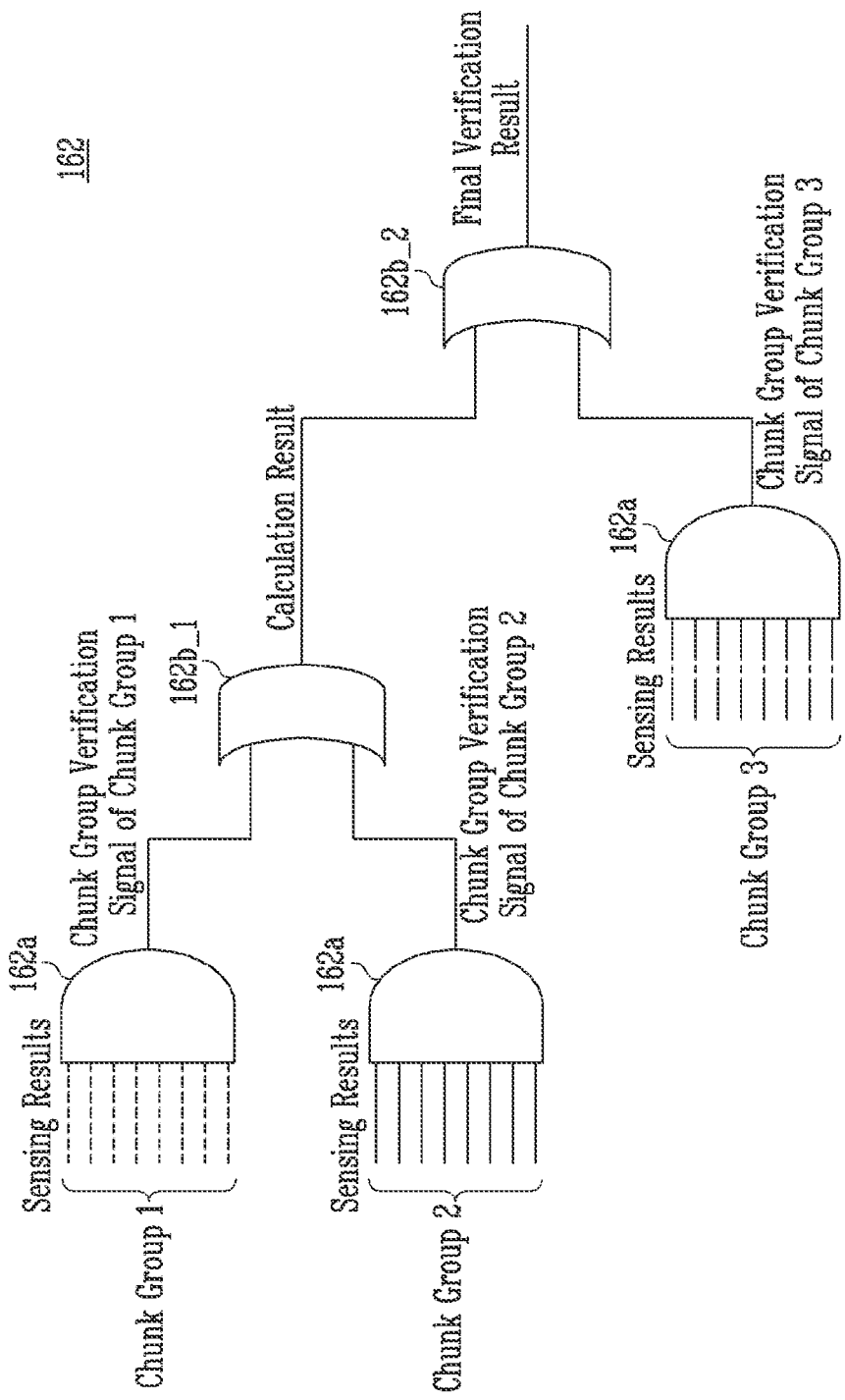
FIG. 8 is a circuit diagram illustrating another example of the verification result output circuit shown in FIG. 6.

FIG. 8 is a circuit diagram illustrating another example of the verification result output circuit shown in FIG. 6.

The verification result output circuit 162 may include three first logic gates 162*a* and two second logic gates 162*b*_1, 162*b*_2. The first logic gate 162*a* may be a logic gate for outputting a chunk group verification signal representing a pass when sensing results corresponding to all chunks included in a chunk group represent a pass. For example, the first logic gate 162*a* may be an AND gate. The three first logic gates 162*a* may respectively output a chunk group verification signal of a first chunk group, a chunk group verification signal of a second chunk group, and a chunk group verification signal of a third chunk group to the second logic gates 162*b*.

The second logic gates 162*b*_1, 162*b*_2 may be a logic gate for outputting a final verification result representing a pass when any one signal, among the chunk group verification signals received from the first logic gates, represents a pass. For example, the second logic gate 162*b*_1, 162*b*_2 may be an OR gate.

In an embodiment, as shown in FIG. 8, the chunk group verification signal of the first chunk group and the chunk group verification signal of the second chunk group may be provided to any one second logic gate 162*b*_1, and the chunk group verification signal of the third chunk group may be provided to the other second logic gate 162*b*_2. The one logic gate 162*b*_1 receiving the chunk group verification signal of the first chunk group and the chunk group verification signal of the second chunk group may provide the other second logic gate 162*b*_2 with a calculation result of the received verification signals. The other second logic gate 162*b*_2 may output a final verification result based on the calculation result received from the second logic gate 162*b*_1 and the chunk group verification signal of the third chunk group.

Alternatively, although not shown in FIG. 8, the verification result output circuit 162 may include three or more first logic gates 162*a* and one second logic gate 162*b*. Based on the received chunk group verification signals, the one second logic gate 162*b* may receive chunk group verification signals from the three or more first logic gates 162*a* and may output a final verification result.

Figure 9:
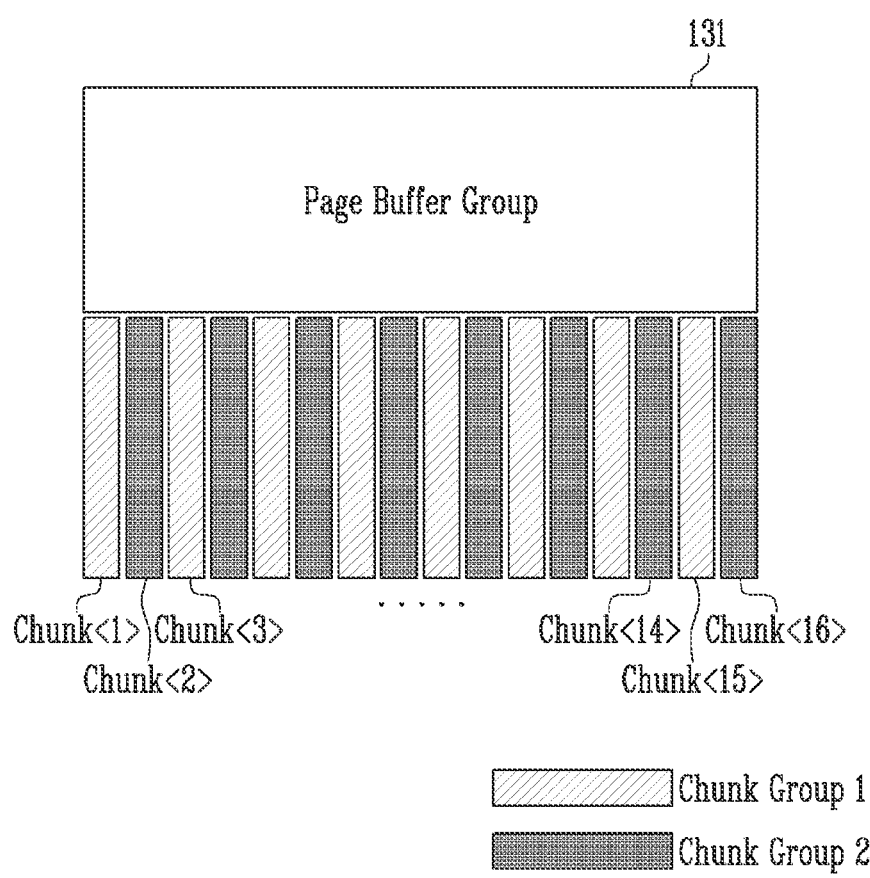
FIG. 9 is one example illustrating chunk group sorting used for a sensing operation of the memory device in accordance with an embodiment of the present disclosure.

FIG. 9 is one example illustrating chunk group sorting used for the sensing operation of the memory device in accordance with an embodiment of the present disclosure.

Figure 10:
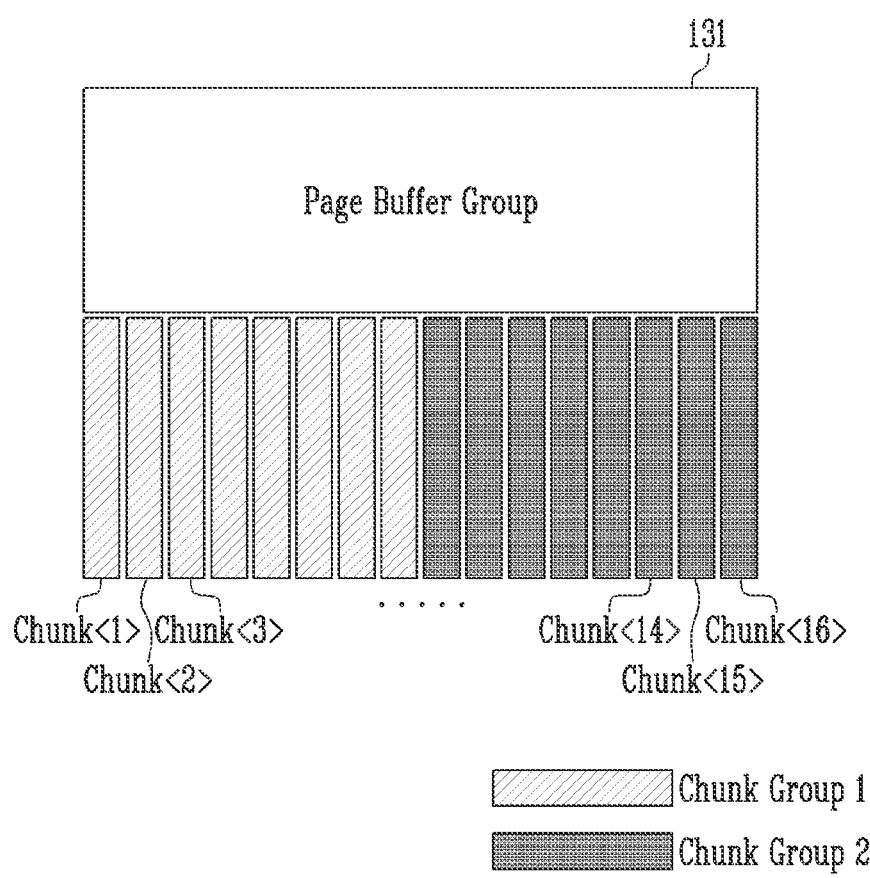
FIG. 10 is another example illustrating the chunk group sorting used for the sensing operation of the memory device in accordance with an embodiment of the present disclosure.

FIG. 10 is another example illustrating the chunk group sorting used for the sensing operation of the memory device in accordance with an embodiment of the present disclosure.

Figure 11:
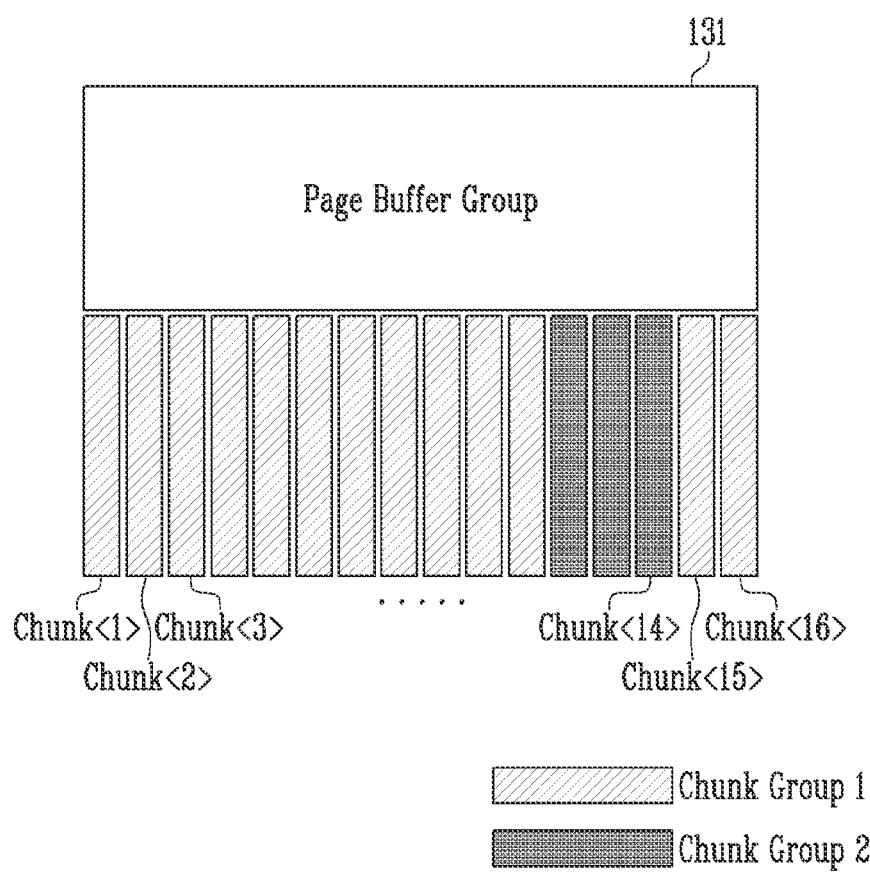
FIG. 11 is still another example illustrating the chunk group sorting used for the sensing operation of the memory device in accordance with an embodiment of the present disclosure.

FIG. 11 is still another example illustrating the chunk group sorting used for the sensing operation of the memory device in accordance with an embodiment of the present disclosure.

Referring to FIGS. 9 to 11, the page buffer group 131 may be sorted into a plurality of chunks Chunk<1> to Chunk<16>, each including a plurality of page buffers. The plurality of chunks may be sorted into a plurality of chunk groups. In an embodiment, adjacent chunks may be included in different chunk groups. In another embodiment, chunks included in one chunk group may be adjacent to each other. In an embodiment, numbers of chunks included in the respective chunk groups may be equal to one another. In another embodiment, the number of chunks included in the respective chunk groups may be different from one another. In an embodiment, information regarding group sorting of chunks may be predetermined. For example, the information regarding group sorting of chunks may be pre-stored in a partial region of the memory cell array 110, shown in FIG. 1. In another embodiment, the group sorting of chunks may be determined under the control of the control logic 14, shown in FIG. 1. For example, when it is necessary to change the group sorting of chunks, a connection relationship between the sensing circuit 161 and the verification result output circuit 162, which are shown in FIG. 4, may be changed according to the control of the control logic 140.

In an embodiment, as shown in FIG. 9, odd-numbered chunks, among the plurality of chunks, may be sorted as a first chunk group, and even-numbered chunks, among the plurality of chunks, may be sorted as a second chunk group. A number of the chunks included in the first chunk group and a number of the chunks included in the second chunk group may be equal to each other.

In another embodiment, as shown in FIG. 10, chunks located at a relatively front side, among the plurality of chunks, may be sorted as a first chunk group, and chunks located at a relatively rear side, among the plurality of chunks, may be sorted as a second chunk group. The number of chunks included in the first chunk group and the number of the chunks included in the second chunk group may be equal to each other.

In still another embodiment, as shown in FIG. 11, chunks located in a predetermined specific region, among the plurality of chunks, may be sorted as a second chunk group, and the other chunks may be sorted as a first chunk group. The number of chunks included in the second chunk group may be smaller than the number of chunks included in the first chunk group. For example, chunks having a relatively high error occurrence probability may be included in the second chunk group.

Although examples in which the chunks are sorted as the first chunk group or the second chunk group have been illustrated in FIGS. 9 to 11, the present disclosure is not limited thereto, and the chunks may be sorted into three or more chunk groups. The sorting of chunk groups in the memory device may be variously set according to characteristics of the memory device.

Figure 12:
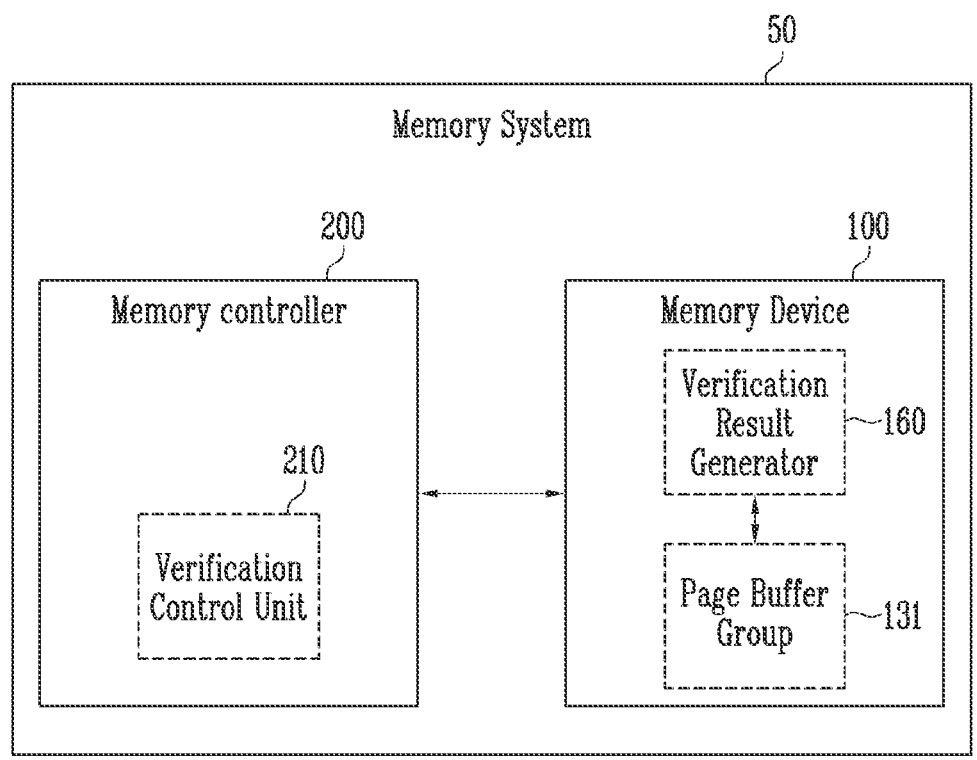
FIG. 12 is a diagram illustrating a memory system in accordance with an embodiment of the present disclosure.

FIG. 12 is a diagram illustrating a memory system in accordance with an embodiment of the present disclosure.

Referring to FIG. 12, the memory system 50 may include a memory device 100 and a memory controller 200. The memory system 50 may be a device for storing data under the control of a host, such as a mobile phone, a smart phone, an MP3 player, a laptop computer, a desktop computer, a game console, a TV, a tablet PC, or an in-vehicle infotainment system. Alternatively, the memory system 50 may be a device for storing data under the control of the host for storing high-capacity data in one place, such as a server or a data center.

The memory system 50 may be manufactured as any one of various types of storage devices according to a host interface that is a communication scheme with the host. Also, the memory system 50 may be manufactured as any one of various kinds of package types.

The memory device 100 may store data. The memory device 100 may operate under the control of the memory controller 200. Therefore, the memory device 100 may include a page buffer group 131 and a verification result generator 160. Also, the memory device 100 may include a memory cell array 110 including a plurality of memory cells for storing data. Each of the memory cells may be configured as any one of a Single Level Cell (SLC) storing one data bit, a Multi-Level Cell (MLC) storing two data bits, a Triple Level Cell (TLC) storing three data bits, and a Quadruple Level Cell (QLC) storing four data bits. The memory cell array 110 may include a plurality of memory blocks. Each memory block may include a plurality of memory cells. Each memory block may include a plurality of pages. In an embodiment, the page may be a unit for storing data in the memory device 100 or reading data stored in the memory device 100. The memory block may be a unit for erasing data. The verification result generator 160 may perform a sensing operation on the page buffer group 131 connected to the memory cell array 110 under the control of the memory controller 200.

In an embodiment, the memory device 100 may be implemented with various types of volatile memories, non-volatile memories, or the like. In this specification, for convenience of description, a case in which the memory device 100 is a NAND flash memory is assumed and described.

The memory device 100 may receive a command and an address from the memory controller 200, and access an area selected by the address in the memory cell array. The memory device 100 may perform an operation indicated by the command on the area selected by the address. For example, the memory device 100 may perform a write operation (program operation), a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address. In an embodiment, training information may be stored in the memory device 100.

The memory controller 200 may control overall operations of the memory system 50.

When power is applied to the memory system 50, the memory controller 200 may execute firmware (FW). When the memory device 100 is a flash memory device, the memory controller 200 may execute FW such as a flash translation layer (FTL) for controlling communication between the host and the memory device 100.

In an embodiment, the memory controller 200 may receive a Logical Address (LA) from the host and may translate the LA into a Physical Address (PA) representing addresses of memory cells in the memory device 100 in which data is to be stored or from which data is to be read.

The memory controller 200 may control the memory device 100 to perform a program operation, a read operation, an erase operation, or the like in response to a request from the host. In the program operation, the memory controller 200 may provide a program command, a PA, and data to the memory device 100. In the read operation, the memory controller 200 may provide a read command and a PA to the memory device 100. In the erase operation, the memory controller 200 may provide an erase command and a PA to the memory device 100.

In an embodiment, the memory controller 200 may autonomously generate a command, an address, and data regardless of any request from the host, and transmit the command, the address, and the data to the memory device 100. For example, the memory controller 200 may provide the memory device 100 with a command, an address, and data, which are used to perform read and program operations accompanied in performing wear leveling, read reclaim, garbage collection, or the like.

In an embodiment, the memory controller 200 may control at least two memory devices 100. The memory controller 200 may control the memory devices 100 according to an interleaving scheme to improve operational performance.

The interleaving scheme may be a scheme for controlling operations on at least two memory devices 100 to overlap with each other.

In an embodiment, the memory controller 200 may include a verification control unit 210. The verification control unit 210 may control a sensing operation on the memory device 100. The verification control unit 210 may provide the memory device 100 with information necessary for the sensing operation performed on the memory device 100. For example, the information necessary for the sensing operation may include information on an address associated with the performance of the sensing operation, information on a reference current or a reference voltage, information on a reference with respect to pass or fail of the sensing operation, information on a group sorting reference of chunks, and the like. Also, the verification control unit 210 may receive a final verification result according to the sensing operation from the memory device 100. The memory controller 200 may control a subsequent operation on the memory device 100, based on the final verification result received from the memory device 100.

Figure 13:
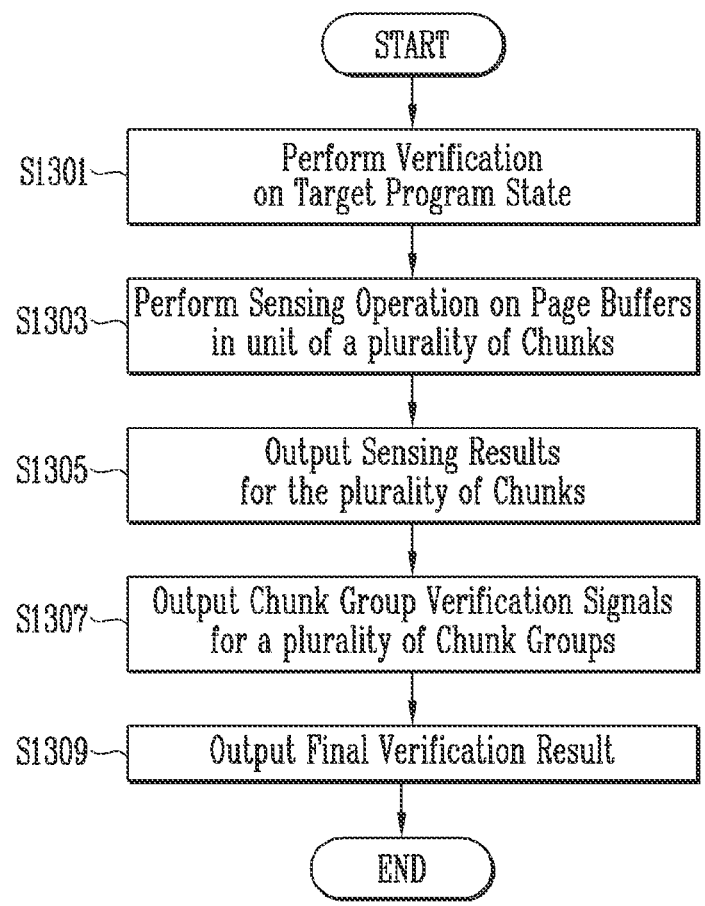
FIG. 13 is a flowchart illustrating an operating method of the memory device in accordance with an embodiment of the present disclosure.

FIG. 13 is a flowchart illustrating an operating method of the memory device in accordance with an embodiment of the present disclosure.

Referring to FIGS. 1 to 13, in step S1301, the read/write circuit 130 of the memory device 100 may perform a verify operation by applying a verify voltage to a selected word line under the control of the control logic 140. The verify operation may be performed on any one target program state, among a plurality of program states to which memory cells connected to the selected word line are to be programmed. Although a case in which the verify operation is performed on only a target program state on which the sensing operation is to be performed is illustrated in FIG. 13, the verify operation may be performed on a plurality of program states including the target program state in one program loop in accordance with various embodiments. The verify operation may be performed by applying a verify voltage to a word line connected to selected memory cells and comparing a threshold voltage of the selected memory cells with the verify voltage. A comparison result may be stored in page buffers respectively connected to the selected memory cells. Before step S1301, a program pulse may be applied to the selected word line.

In step S1303, the sensing circuit in the verification result generator 160 may perform a sensing operation on a plurality of page buffers respectively connected to memory cells through bit lines. That is, according to step S1301, the comparison result of the threshold voltage of the selected memory cells and the verify voltage, which is stored in the page buffers, may be sensed. The sensing operation may be performed in units of chunks, each including a plurality of page buffers.

In step S1305, the sensing circuit in the verification result generator 160 may output each sensing result of each of a plurality of chunks. When a fail bit number in a chunk is equal to or smaller than a predetermined number, a sensing result of the chunk may be output as a pass. When the fail bit number in the chunk exceeds the predetermined number, the sensing result of the chunk may be output as a fail. The sensing result output from the sensing circuit may be provided to the first logic gate in the verification result generator 160.

In step S1307, the first logic gate in the verification result generator 160 may output chunk group verification signals of a plurality of chunk groups, each including a plurality of chunks. The chunk group verification signal may be output by combining sensing results of chunks included in a corresponding chunk group. The chunk group verification signals output from the first logic gate may be provided to the second logic gate in the verification result generator 160.

In step S1309, the second logic gate in the verification result generator 160 may output a final verification result by combining the received chunk group verification signals. The final verification results may be a signal representing pass or fail. The output final verification result may be provided to the control logic 140. The control logic 140 may control a program operation on the memory cell array 110 according to the output final verification result. That is, the control logic 140 may determine a program pulse to be applied to the memory cell array 110 according to the output final verification result. For example, when the final verification result is a signal representing the pass, the control logic 140 may control the peripheral circuit to omit verification on a target program state in a subsequent program loop. Also, the control logic 140 may control the peripheral circuit to perform an operation of sensing a verification result of a new target program state by setting a program state that occurs after the target program state to the new target program state. When the final verification result is a signal representing a fail, the control logic 140 may control the peripheral circuit to re-perform verification on the target program state that has already been set in a subsequent program loop. Also, the control logic 140 may control the peripheral circuit to re-perform an operation of sensing a verification result on the target program state.

Figure 14:
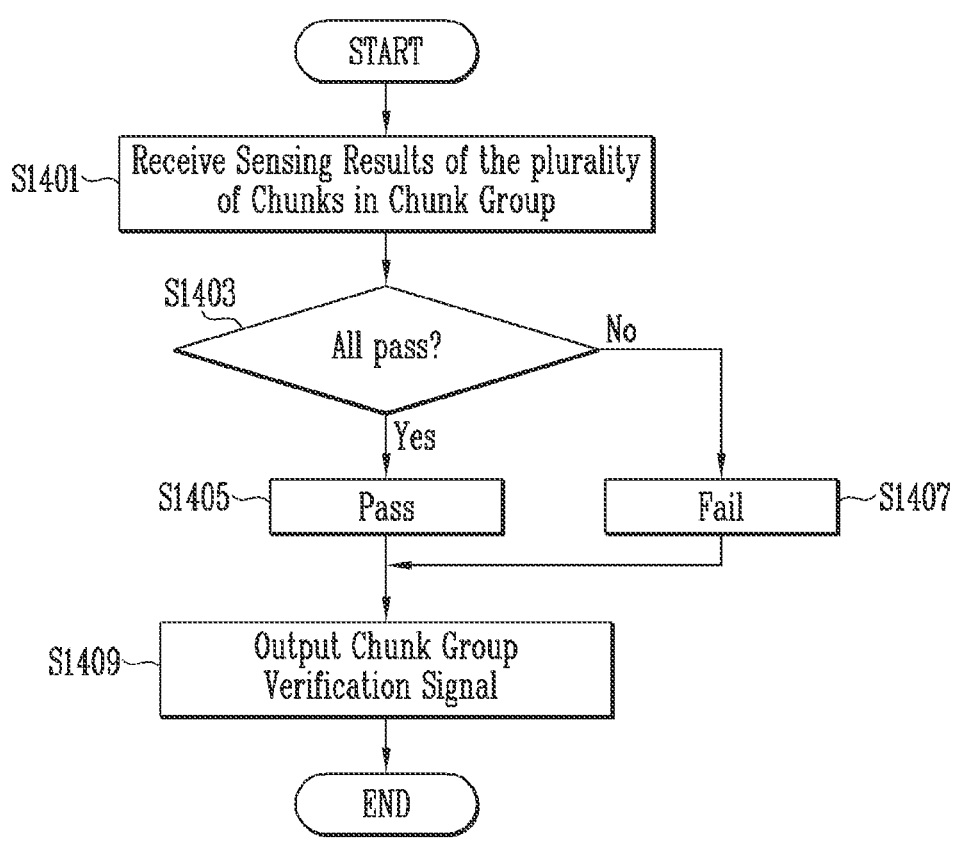
FIG. 14 is a flowchart illustrating step S1307, shown in FIG. 13, in more detail.

FIG. 14 is a flowchart illustrating step S1307, shown in FIG. 13, in more detail.

Referring to FIGS. 13 and 14, in step S1401, the first logic gate in the verification result generator 160 may receive sensing results of a plurality of chunks in a chunk group. The sensing results of the plurality of chunks may be sensing results output through step S1305, shown in FIG. 13. In an embodiment, sensing results of chunks belonging to different chunk groups may be received by different first logic gates.

In step S1403, the first logic gate may determine whether the received sensing results all represent a pass. When the received sensing results all represent a pass, the first logic gate may determine chunk group verification on a corresponding chunk group as a pass (step S1405). When at least one result, among the received sensing results, represents a fail, the first logic gate may determine the chunk group verification on the corresponding chunk group as a fail (step S1407).

In step S1409, the first logic gate may output a chunk group verification signal based on the chunk group verification result determined through step S1405 or S1407.

Figure 15:
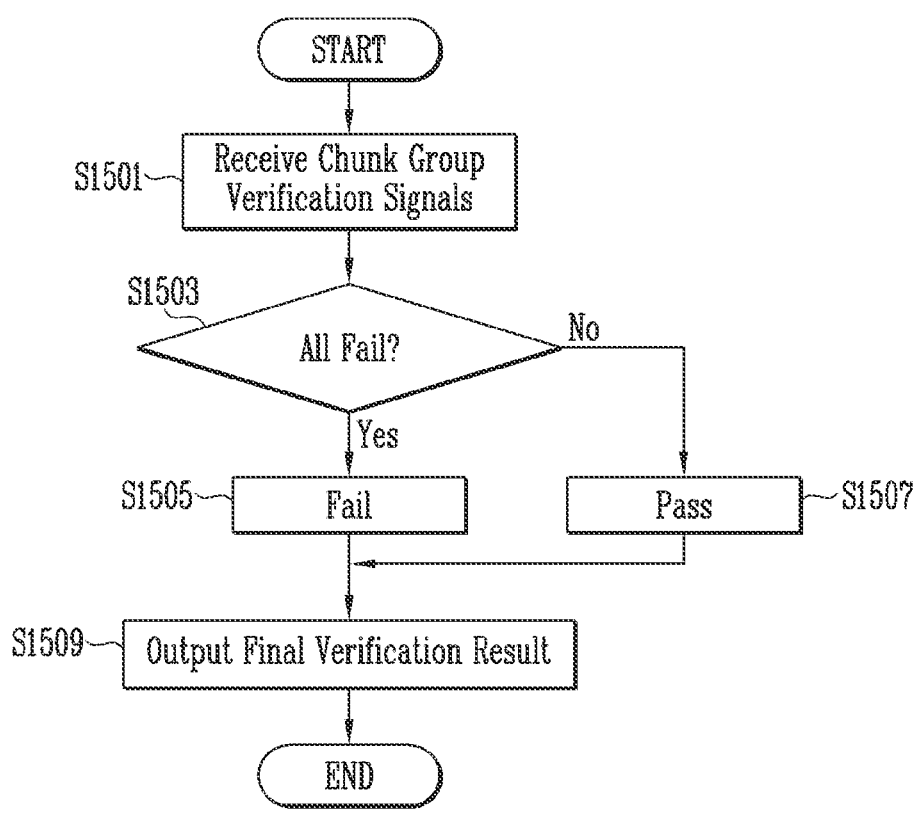
FIG. 15 is a flowchart illustrating step S1309, shown in FIG. 13, in more detail.

FIG. 15 is a flowchart illustrating step S1309, shown in FIG. 13, in more detail.

Referring to FIGS. 13 and 15, in step S1501, the second logic gate in the verification result generator 160 may receive chunk group verification signals of a plurality of chunk groups. The chunk group verification signals of the plurality of chunk groups may be chunk group verification signals output through step S1307, shown in FIG. 13.

In step S1503, the second logic gate may determine whether the received chunk group verification signals all represent a fail. When the received chunk group verification signals all represent a fail, the second logic gate may determine a verification result of page buffers as a fail (step S1505). When a verification result of at least one of the received chunk group signals represents a pass, the second logic gate may determine a verification result of corresponding page buffers as a pass (step S1507).

In step S1509, the second logic gate may output a final verification result based on the verification result determined through step S1505 or S1507.

Figure 16:
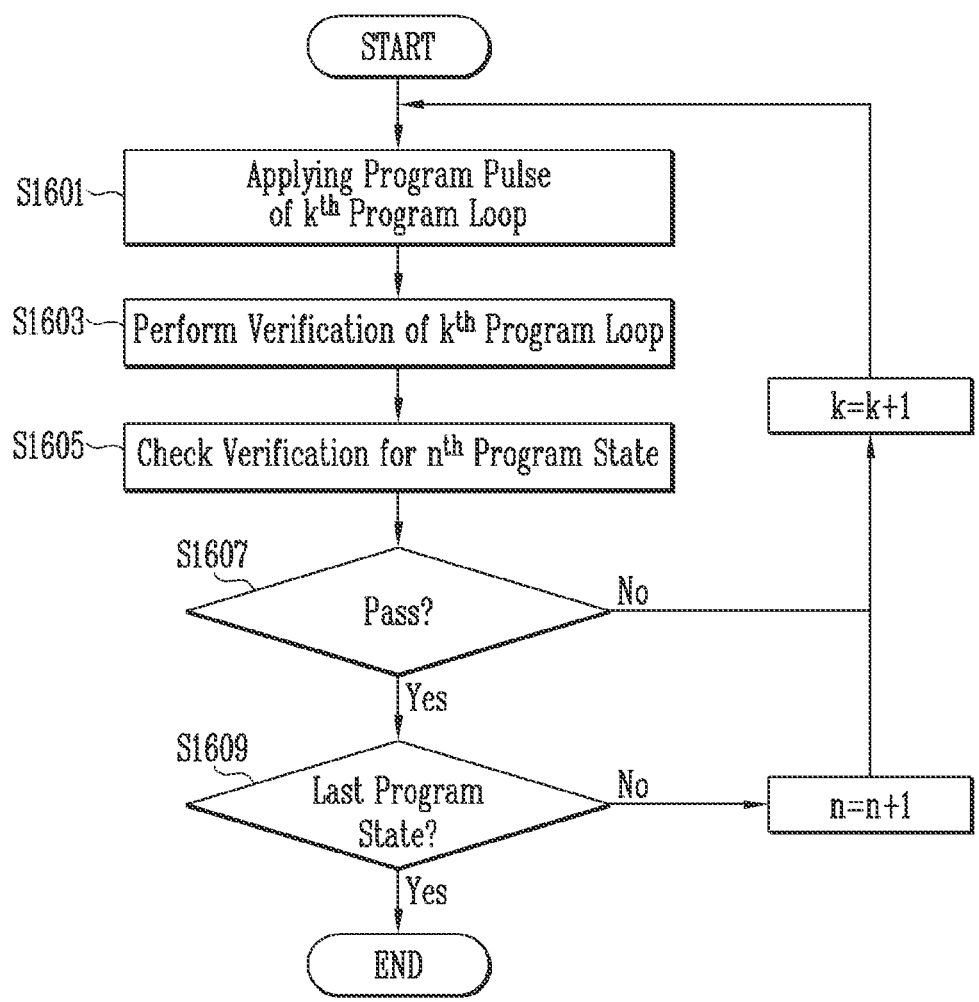
FIG. 16 is a flowchart illustrating a process in which a program operation is performed according to the operating method of the memory device in accordance with an embodiment of the present disclosure.

FIG. 16 is a flowchart illustrating a process in which a program operation is performed according to the operating method of the memory device in accordance with an embodiment of the present disclosure.

Referring to FIGS. 1, 13, and 16, in step S1601, a program pulse corresponding to a kth program loop may be applied to a selected word line of the memory cell array 110 under the control of the control logic 140.

In step S1603, the verification result generator 160 may perform a verify operation corresponding to the kth program loop under the control of the control logic 140. A verify operation on an nth program state may be included in the verify operation corresponding to the kth program loop. The nth program state may be the target program state mentioned in FIG. 13. Step S1603 may be step S1301, shown in FIG. 13.

In step S1605, the control logic 140 may check whether the verify operation on the nth program state has passed according to a final verification result output by the verification result generator 160 and may perform a subsequent program operation based on whether the verify operation on the nth program state has passed as shown in step S1607. Step S1605 may include steps S1303 to S1309, shown in FIG. 13.

For example, when the final verification result does not represent a pass, i.e., when the final verification result represent a fail, the control logic 140 may return to step S1601 to control the peripheral circuit of the memory device 100 to perform a program pulse apply operation and a verify operation, which correspond to a (k+1)th program loop. Also, the control logic 140 may control the peripheral circuit and the verification result generator 160 to re-check whether the verify operation on the nth program state has passed. A program pulse applied in the (k+1)th program loop may be a program pulse that is increased as compared with the program pulse applied in the kth program loop, but the present disclosure is not limited thereto. The verify operation corresponding to the (k+1)th program loop may include a verify operation on the nth program state.

When the final verification signal represents a pass, in step S1609, the control logic 140 may check whether the nth program state is a last program state. When the nth program state is not the last program state, the control logic 140 may control the peripheral circuit of the memory device 100 to perform the program pulse apply operation and the verify operation on the (k+1)th program loop. Also, the control logic 140 may control the peripheral circuit and the verification result generator 160 to re-check when a verify operation on an (n+1)th program state has passed. The program pulse applied in the (k+1)th program loop may be a program pulse increased as compared with the program pulse applied in the kth program loop, but the present disclosure is not limited thereto. The verify operation corresponding to the (k+1)th program loop might not include the verify operation on the nth program state. The verify operation corresponding to the (k+1)th program loop may include the verify operation on the (n+1)th program state.

When the nth program loop is the last program loop, the control logic 140 may end the program operation.

Figure 17:
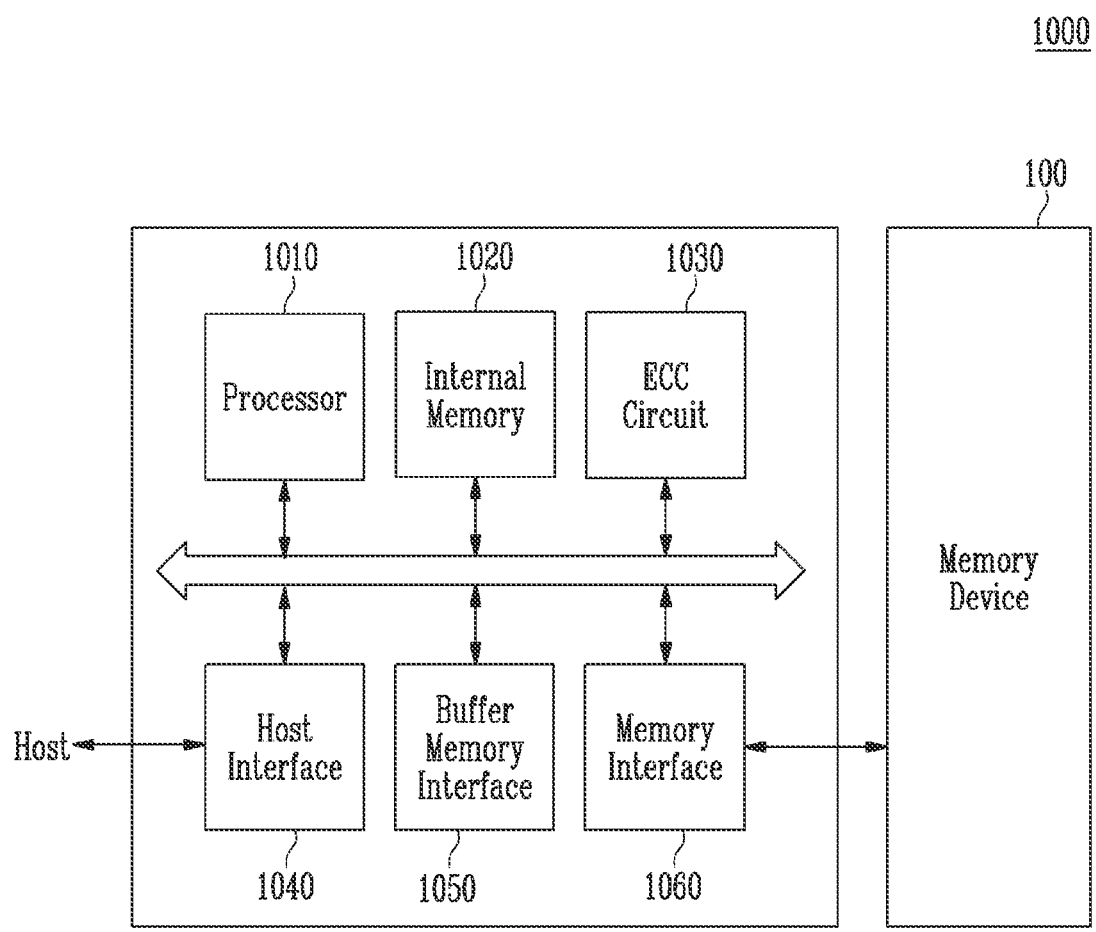
FIG. 17 is a diagram illustrating another embodiment of a memory controller shown in FIG. 12.

FIG. 17 is a diagram illustrating another embodiment of the memory controller shown in FIG. 12.

Referring to FIG. 17, a memory controller 1000 may include a processor 1010, an internal memory 1020, an error correction code (ECC) circuit 1030, a host interface 1040, a buffer memory interface 1050, and a memory interface 1060.

The processor 1010 may perform various calculations for controlling the memory device 100 or generating various commands. When the processor 1010 receives a request from a host, the processor 1010 may generate a command according to the received request and may transmit the generated command to a queue controller (not shown). The processor 1010 may control a subsequent operation on the memory device 100 based on a verification result that the memory interface receives from the memory device 100.

The internal memory 1020 may store various information necessary for an operation of the memory controller 1000. For example, the internal memory 1020 may include logical and physical address map tables.

The ECC circuit 1030 may be configured to detect and correct an error of data received from the memory device 100 by using an error correction code (ECC). The processor 1010 may adjust a read voltage according to an error detection result of the ECC circuit 1030 and may control the memory device 100 to perform re-reading. In an exemplary embodiment, an error correction block may be provided as a component of the memory controller 1000.

The host interface 1040 may exchange a command, an address, and data between the memory controller 1000 and the host. For example, the host interface 1040 may receive a request, an address, data, and the like from the host and may output data read from the memory device to the host. The host interface 1040 may communicate with the host by using various protocols.

The buffer memory interface 1050 may transfer data between the processor 1010 and a buffer memory (not shown). The buffer memory (not shown) may be used as a working memory or a cache memory of the memory controller 1000 and may store data used in the memory system 50. The buffer memory may be used as a read buffer, a write buffer, a map buffer, or the like by the processor 1010.

The memory interface 1060 may exchange a command, an address, data, and the like between the memory controller 1000 and the memory device 100. For example, the memory interface 1060 may transfer a command, an address, data, and the like to the memory device 100 through a channel and may receive data and the like from the memory device 100. The memory interface 1060 may perform a verify operation on the memory device 100 and a sensing operation based on a result of the verify operation according to an instruction of the processor 1010. Also, the memory interface 1060 may receive a verification result from the memory device 100.

In accordance with the present disclosure, there can be provided a memory device having an improved operation speed, an operating method thereof, and a verification result generator.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made based on the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made based on the technological scope of the present disclosure in addition to the embodiments disclosed herein.

What is claimed is:

1. A memory device comprising:
   a memory cell array including a plurality of memory cells;
   a peripheral circuit including a plurality of page buffers respectively connected to the plurality of memory cells through a plurality of bit lines;
   a sensing circuit connected to the plurality of page buffers respectively through a plurality of sensing lines, the sensing circuit:
   performing a sensing operation on the page buffers in units of a plurality of chunks, each chunk including two or more page buffers, among the plurality of page buffers, and
   outputting a sensing result of each of the plurality of chunks;
   a verification result output circuit configured to output a final verification result of a target program state, among a plurality of program states to which the memory cells are to be programmed, based on the sensing results of the plurality of chunks; and
   a control logic configured to control the sensing circuit and the peripheral circuit based on the final verification result,
   wherein the verification result output circuit is configured to output a final verification result representing that a verification on the target program state has passed when a sensing result of at least one chunk group, among a plurality of chunk groups, formed by classifying the plurality of chunks, represents pass.

2. The memory device of claim 1, wherein the verification result output circuit includes:
   a plurality of first logic gates configured to output chunk group verification signals of the respective chunk groups by combining the sensing results of the chunks for each of the chunk groups; and
   a second logic gate configured to output the final verification result by combining the chunk group verification signals.

3. The memory device of claim 2, wherein, when sensing results of input chunks all correspond to a signal representing pass, each of the plurality of first logic gates is configured to output a chunk group verification signal representing that a verify operation on a corresponding chunk group has passed.

4. The memory device of claim 2, wherein, when any one chunk group verification signal among the chunk group verification signals represents pass, the second logic gate is configured to output a final verification result representing that the verification of the target program state has passed.

5. The memory device of claim 1, wherein adjacent chunks, among the chunks, are included in different chunk groups.

6. The memory device of claim 1, wherein each of the chunk groups includes a plurality of adjacent chunks.

7. The memory device of claim 1, wherein a number of chunks included in the respective chunk groups is equal to one another.

8. The memory device of claim 1, wherein a number of chunks included in the respective chunk groups is different from one another.

9. The memory device of claim 1, wherein the control logic is configured to control the peripheral circuit to program the memory cells to the plurality of program states.

10. The memory device of claim 9, wherein the control logic is configured to output a select signal for selecting a chunk on which the sensing operation is to be performed.

11. The memory device of claim 10, wherein the sensing circuit is configured to perform the sensing operation on the chunk selected by the select signal.

12. The memory device of claim 11, wherein the control logic is configured to control a program operation on the memory cells in response to the final verification result.

13. The memory device of claim 1, wherein the sensing circuit is configured to output the sensing result by sensing a current of the sensing lines connected to the page buffers.

14. A method of operating a memory device, the method comprising:
   performing a verification on a target program state, among a plurality of program states to which a plurality of memory cells are to be programmed;
   performing a sensing operation on a plurality of page buffers, respectively connected to the memory cells, through bit lines in units of a plurality of chunks, each chunk including two or more page buffers, among the plurality of page buffers, to acquire a verification result of the target program state;
   outputting a sensing result of each of the plurality of chunks;
   outputting chunk group verification signals representing whether a verify operation on a plurality of chunk groups formed by classifying the plurality of chunks, has passed; and
   outputting a final verification result representing that the verification on the target program state has passed, when a chunk group verification signal of at least one chunk group among the chunk group verification signals represents pass.

15. The method of claim 14, wherein, in the outputting of the chunk group verification signals, when sensing results of chunks included in any one of the plurality of chunk groups all represent pass, a chunk group verification signal, representing pass, is output.

16. The method of claim 14, further comprising performing a program operation on the memory cells based on the final verification result.

17. The method of claim 16, wherein, in the performing of the program operation on the memory cells, when the final verification result represents pass, the verification on the target program state is omitted based on the final verification result.

18. The method of claim 16, wherein, in the performing of the program operation on the memory cells, when the final verification result represents fail, the verification on the target program state is repeated based on the final verification result.

19. A verification result generator comprising:
- a sensing circuit configured to perform a sensing operation on a plurality of page buffers respectively connected to a plurality of memory cells in units of a plurality of chunks, each chunk including two or more page buffers, among the plurality of page buffers, and configured to output a sensing result of each of the plurality of chunks;
- a plurality of first logic gates configured to output chunk group verification signals of respective chunk groups, each chunk group including one or more chunks, by combining the sensing results of the chunks for each of the chunk groups; and
- a second logic gate configured to, when at least one chunk group verification signal, among the chunk group verification signals, represents pass, output a final verification result representing pass by combining the chunk group verification signals.

* * * * *